Aug. 15, 1961 B. E. CARDER 2,996,260
FEED MILL CYLINDER
Filed June 4, 1958
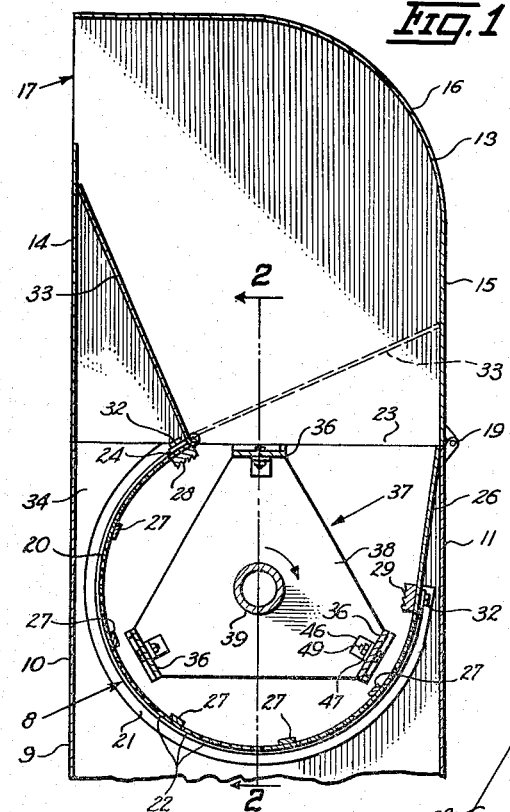
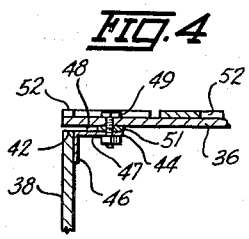
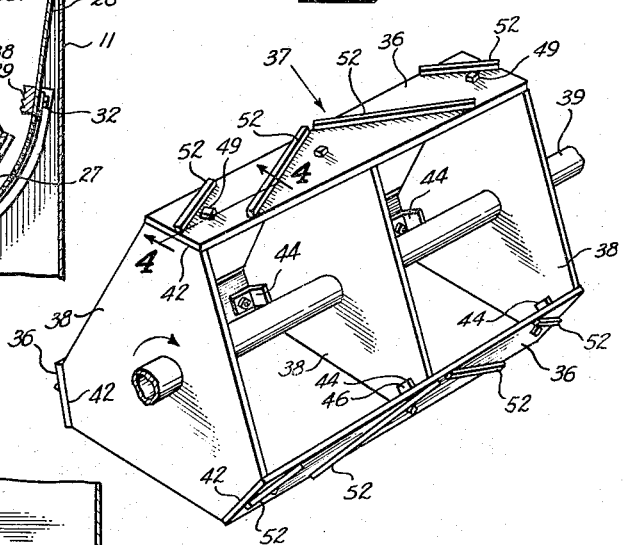
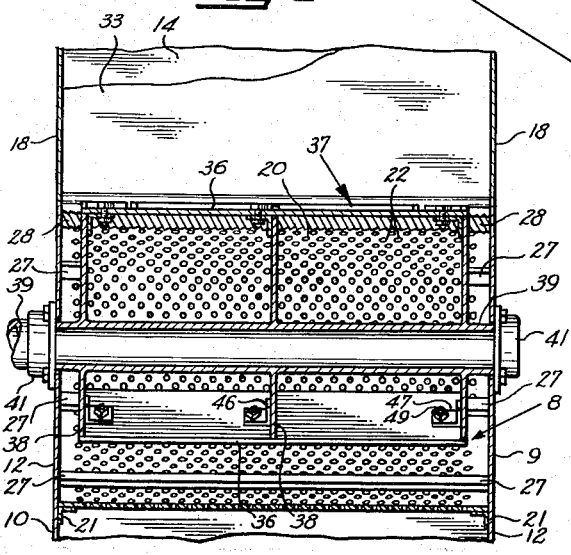
INVENTOR.
BILLY E. CARDER
BY Lowell & Henderson
ATTORNEY.

United States Patent Office 2,996,260
Patented Aug. 15, 1961

2,996,260
FEED MILL CYLINDER
Billy E. Carder, North English, Iowa
Filed June 4, 1958, Ser. No. 739,725
3 Claims. (Cl. 241—73)

This invention relates to a machine of the feed mill type which is designed for grinding grain, such as ear corn, shell corn and the like for animal feed, and is concerned particularly with that portion of the machine utilized for shelling the corn, crumbling the cob and shredding the husks in one operation.

An object of this invention is to provide an improved machine for processing ear corn for feed purposes.

Another object of this invention is to provide a feed mill machine having a greater capacity for processing ear corn than that of known machines, which increased capacity is obtained by less power and less wear on operating parts.

A further object of this invention is to provide in a feed mill machine including coacting rotating and stationary breaker bars, an arrangement for readily and effectively adjusting the working clearance between the two types of bars.

Another object of this invention is to provide in a feed mill machine including a cylindrical type screen or concave through which material is forced, a utilization of the complete area of the screen, such that the amount and the rate of material flow through the screen is equal as to all common portions of the screen and at all times during the processing thereof.

Yet another object of this invention is to provide in a feed mill machine having a cylinder portion including a cylindrical screen and a rotating reel therein, a cylinder portion which is economical to manufacture, rugged, easily maintained and adjustable, and highly effective in use.

These and other objects will be readily apparent by reference to the following description and the accompanying drawings, wherein:

FIG. 1 is a fragmentary vertical sectional view of a feed mill machine and showing the hood and the cylinder units thereof;

FIG. 2 is a vertical sectional view taken along the line 2—2 in FIG. 1;

FIG. 3 is a perspective view of the rotating reel unit of the cylinder unit of FIG. 1; and FIG. 4 is an enlarged cross sectional view taken along the line 4—4 of FIG. 3.

A conventional feed mill machine to which this invention may be adapted as by initial installation when the machine is built or as by attachment when the machine is in the field, comprises generally a frame which may be stationary or mounted on wheels for attachment to a farm tractor for towing purposes. Such a machine includes an opening into which the material to be processed is entered, the opening usually being enclosed by a hopper for hand or mechanical feeding. Power for either type machine is supplied by an external source by means of belt or chain drive.

Within the machine, a cylinder unit, to which this invention is primarily directed, is arranged below the opening to receive the ear corn passed therethrough. The cylinder unit, upon operation, shells the corn, crumbles the cobs and shreds the husks. During this processing by the cylinder unit, the corn is forced through a screen and then drops by gravity into a rolling unit where the material is cracked and crimped. The finished product is then ready for discharge from the machine by any conventional method, such as by an auger type elevator.

Referring now to the drawings, a cylinder unit, indicated generally at 8 in FIG. 1, is encased within a substantially rectangular housing 9 which includes side panels 10 and 11 and end panels 12 (FIG. 2). A hood 13 is mounted on top of the housing 9 and is comprised of a short upstanding side 14 and an opposite side 15 the upper portion 16 of which curves toward and over the top of the side 14 so as to form an opening 17 therebetween. End pieces 18 (FIG. 2) complete the hood 13.

For the purpose of providing easy access to the cylinder unit 8, the hood 13 is pivotally mounted to the housing 9 by a pair of hinge devices 19 (FIG. 1) at each end of the housing. The hinge devices 19 join the end panels 12 and the end pieces 18, and as the widths of the elements 12 and 18 are the same, when the hood 13 is closed, the lower edge of the side 14 of the hood rests upon the top edge of the housing side panel 10 (FIG. 1).

The cylinder unit 8, which is inserted centrally within the housing 9, comprises a screen member 20 which extends substantially the entire length of the housing 11 (FIG. 2) and which is substantially circular in cross section (FIG. 1). The screen is removably secured to the end panels 12 of the housing by angle iron bands 21 and is provided with a plurality of perforations 22 of predetermined size. A mouth 23 is provided at the upper portion of the screen which faces the curved portion 16 of the hood, the mouth 23 extending the length of the housing 11 and being defined on one side by an upper edge 24 of the screen and on the other side by a substantially straight, vertically disposed portion 26 of the screen 20. To give support to the screen 20, a plurality of arcuately spaced, elongated straps 27 run its entire length.

A pair of elongated stationary bars 28 and 29 are secured to the inner surface of the screen 20, at locations best indicated in FIG. 1. As viewed, in FIG. 1, one bar 28 is secured along the upper edge 24 of the screen and the other bar 29 is secured along the lower part of the vertical portion 26. The faces (FIG. 1) of the bars are ridged or provided with teeth for abrading purposes. Each bar 28 and 29 is secured to the screen as by a plurality of cap screws 32 and extends substantially the length of the housing 9.

A shield 33 is hingedly connected along its base edge to the upper edge 24 of the screen 20 in such a manner that it is adapted to assume either of the two positions indicated in FIG. 1. In the position of the shield 33 indicated by the full lines, it may readily be observed that the shield acts to prevent material which has entered the hood opening 17 from falling through the space 34 between the screen 20 and the adjacent side 10 of the housing 9. When the shield 33 is in the position indicated by the dotted lines, however, the material entering through the opening 16 is prevented from entering the cylinder mouth 23 and passes instead through the space 34. By providing the shield 33, it may readily be observed that should it be unnecessary to use the cylinder unit 9, as where small grain is being processed, the grain merely bypasses the unit 9.

For coaction with the two stationary bars 28 and 29, a trio of rotating bars 36 are provided as part of a reel unit 37 (FIG. 3) and have a length substantially equal to that of the stationary bars 28, 29 (FIG. 2). In addition to the bars 36, the reel unit 37 includes a trio of flat, triangular plate members 38 to which the bars 36 are adjustably mounted. The plate members 38 are securely mounted on an elongated drive shaft 39 in longitudinally spaced, parallel relation, the shaft being extended through the centers of the plates 38 and rotatably inserted in bearing units 41 secured to the end panels 12 of the housing 9. Drive to the shaft 39 is imparted from an external source (not shown).

By removing a like portion from each corner of a plate member 38, three ledges 42 are formed each of which extends normal to a line bisecting the ledge and running through the longitudinal axis of the shaft 39. Then, by mounting the plate members 38 parallel to each other and longitudinally aligning the common ledges 42, three points of support lying in a straight plane (FIG. 2) are provided for each rotating bar 36. By this arrangement, the longitudinal axis of each bar 36 is parallel to the longitudinal axes of the other bars 36 and also to the longitudinal axes of the shaft 39 and the stationary bars 28 and 29. Additionally, the flat faces of the bars 36 define planes which intersect each other.

Referring to FIG. 4, the structure for mounting a bar 36 to each ledge 42 is best disclosed. A short piece 44 of angle iron has one leg 46 secured flat against the side of a plate member 38 with the other leg 47 extended away from the plate member so that the upper surface 48 of the leg 47 is even with the ledge 42. A cap screw or bolt device 49 is then inserted through the leg 47 and the bar 36 to hold them together.

To space the bar 36 away from a leg 47, one or more shims 51 may be inserted over the device 49 between the bar 36 and the leg 47. This arrangement provides for adjusting the spacing of the rotating bars 36 from the shaft 39 and thus adjusting the clearance of the bars 36 relative to the stationary bars 28 and 29. Of note, a plurality of elongated metal bars 52, commonly called beads, may be welded to the face of each bar 36. In FIG. 3, the beads 52 are shown as arranged in a herringbone pattern.

In use, assuming ear corn is to be processed by the cylinder unit 8, the shield 33 is in the full line position of FIG. 1, and the reel unit 36 is rotated in the direction indicated by the arrow in FIG. 1 by virtue of drive being imparted by the shaft 39. Corn (not shown) entering the opening 17 is then directed toward and through the mouth 23 of the cylinder unit 8 it being noted that the length of the mouth 23 is substantially equal to the length of the unit 8 (FIG. 2). Within the cylinder unit, the coaction of the faces of the rotating bars 36 with the stationary bars 28 and 29 and also with the straps 27, act to shell the corn, and crumble the cobs and shred the husks, the action occurring simultaneously. As the corn is processed, it is then forced through the perforations 22 in the screen 20 from where it drops due to gravity for further processing, if required.

It may be seen that by virtue of the arrangement as described, the corn being processed is spread out evenly across the entire length of the screen 20 so that no one portion or end of the screen is used more than another. This arrangement provides further for even wear of parts and for an even load on the shaft 39 and the bearing units 41.

To maintain the capacity of the cylinder unit 8 at the maximum, it is important that the predetermined initial clearance between the bars 28 and 29 and 36 be maintained. The leading edges of the rotating bars 36 should clear the stationary bar 29 approximately one-eighth inch and the bar 28 approximately one-sixteenth inch. Periodic adjustment must therefore be made due to wear on these parts. Here, by merely swinging back the hood 13 so as to expose the unit 8, each rotating bar 36 may readily be removed for the insertion of shims 51 as mentioned hereinbefore. Should it be necessary, any or all the bars 36 may be replaced. To replace the stationary bars 28 and 29, the screen 20 may be removed from the housing 9.

Although a preferred embodiment of this invention has been disclosed herein, it is to be remembered that various modifications may be made within the scope of the invention, as defined in the appended claims.

I claim:

1. A feed mill for processing ear corn comprising, a housing having an inlet opening through which ear corn can be passed, an outlet opening for the processed ear corn below said inlet opening, a perforated screen member through which processed ear corn can pass extended across said housing and between said openings, said screen member substantially circular in cross section and provided with an opening facing upwardly toward said inlet opening whereby to receive material to be processed entering the inlet opening, a plurality of straight, elongated bar elements of equal length mounted on the inner surface of said screen member and extending the length of said inlet opening, said bar elements being parallel with and spaced circumferentially from each other, and a reel unit mounted for rotation within said screen member, said reel unit having a length comparable to that of the inlet opening and including a rotatable shaft extended substantially along the longitudinal axis of said screen member, a plurality of spaced plate members secured at their centers to said shaft, each of said plate members provided with a plurality of flat ledge portions, said plate members arranged in a parallel manner whereby arcuately spaced groups of common ledge portions are aligned longitudinally, an elongated bar member having a flat face mounted on each group of ledge portions for coaction of the face thereof with said bar elements, each bar member being of a length substantially equal to the length of each bar element, and a plurality of units for connecting said bar members to said plate members whereby said bar members are mounted parallel to said shaft and radially spaced therefrom, said units adapted to vary said radial spacing.

2. A feed mill for processing ear corn, comprising, a housing having an inlet opening through which ear corn can be passed with a mouth of a certain length extended longitudinally of the housing, an outlet opening for the processed corn directly below said inlet opening, a perforated screen member through which processed ear corn can pass extended longitudinally of said housing between said inlet opening and said outlet opening, said screen member being concave in transverse cross-section with the crusher surface facing said inlet opening, a plurality of straight bar elements mounted on said screen and extended parallel to each other and longitudinally of said housing, and a reel unit having a length substantially equal to the length of the inlet opening mouth rotatably mounted to said housing within said screen directly below said inlet opening, said reel unit including a trio of triangular, flat plate members spaced equidistantly apart and a trio of straight flat bar members mounted radially on said plate members and defining intersecting planes, each of said bar members having a substantially flat face adapted for coaction with said bar elements and extended parallel thereto and to the axis of rotation of said reel unit.

3. A feed mill for shelling, shucking and crumbling ear corn and the like comprising, a housing having an inlet opening with a mouth extended longitudinally the length of said housing, an outlet opening below said inlet opening, a perforated screen member extended across said housing and between said openings, said screen member being semi-circular in transverse cross-section with the crusher surface facing toward said inlet opening, a plurality of straight, elongated bar elements mounted on the inner surface of said screen member and extended longitudinally the length of said housing in a parallel manner, and a reel unit mounted for rotation within said screen member, said reel unit having a length comparable to that of said mouth and including a rotatable shaft extended substantially along the longitudinal axis of said screen member, three flat, triangular plate members secured at their centers to said shaft in an equidistantly spaced manner, a ledge formed at each corner of each plate member and which extends normal to a line bisecting the ledge and running radially through the longitudinal axis of said shaft, said plate members arranged in a parallel manner whereby three radially spaced groups of common ledges are longitudinally aligned, an elongated bar member having a flat face mounted on each group of ledge portions for coaction of the face thereof with said bar elements upon rotation of said reel unit, and means mounted on said plate members and extended beneath said bar members for adjusting the clearance of said bar members relative to said bar elements.

References Cited in the file of this patent

UNITED STATES PATENTS

| | | |
|---|---|---|
| 1,721,183 | McKain | July 16, 1929 |
| 2,216,612 | Dimm | Oct. 1, 1940 |
| 2,232,828 | Roddy | Feb. 25, 1941 |
| 2,873,921 | Christiansen | Feb. 17, 1959 |

FOREIGN PATENTS

| | | |
|---|---|---|
| 210,970 | Great Britain | Feb. 14, 1924 |